J. KOENIG.
SAFETY DEVICE FOR PIPING.
APPLICATION FILED MAY 28, 1907.
982,505.
Patented Jan. 24, 1911.
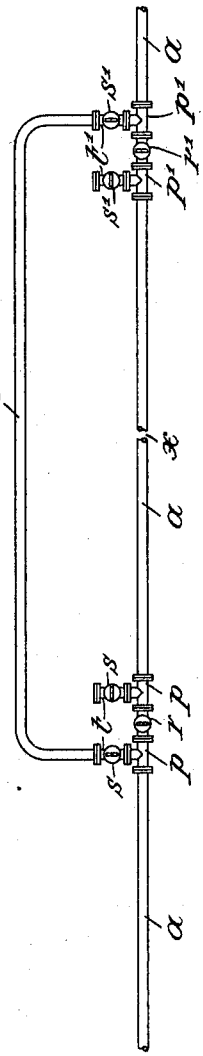
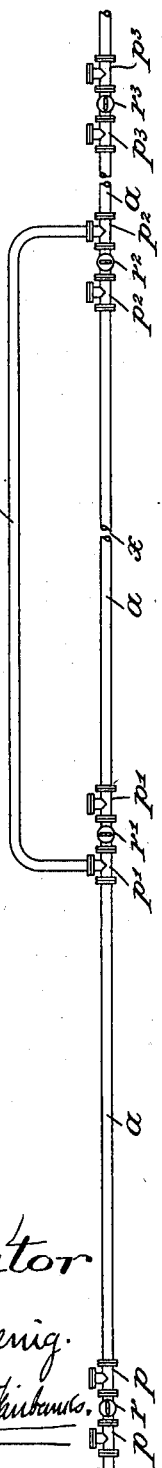
Witnesses:
P. F. Nagle
C. S. McVay
Inventor
By Johann Koenig.
Wiederschein Fairbanks
Attorneys

UNITED STATES PATENT OFFICE.

JOHANN KOENIG, OF RIGA, RUSSIA, ASSIGNOR OF ONE-HALF TO EMIL WITZENMANN, OF PFORZHEIM, BADEN, GERMANY.

SAFETY DEVICE FOR PIPING.

982,505.     Specification of Letters Patent.     Patented Jan. 24, 1911.

Application filed May 28, 1907. Serial No. 376,114.

*To all whom it may concern:*

Be it known that I, JOHANN KOENIG, a subject of the King of Bavaria, residing at 97 Alexanderstrasse, Riga, Russia, have invented new and useful Improvements in Safety Devices for Piping, of which the following is a specification.

The purpose of my invention is to provide means whereby the inconvenience attending the bursting of a water or other pipe can be readily remedied.

My invention is illustrated in the accompanying drawing, in which—

Figure 1 shows piping fitted with one form of the new device, while Fig. 2 is a like view of piping fitted with a modified construction thereof.

In the piping $a$, pairs of T-connecting-pieces $p\ p$, $p^1\ p^1$ are inserted at certain distances apart, with intermediate valved devices $r\ r^1$. The connecting pieces $p$, $p^1$ are respectively furnished with casings $t$, $t^1$, containing the respective valves $s$, $s^1$. In the event of the piping $a$ bursting, for example, at $x$, the two valves $r$, $r^1$, located at the respective ends of the ruptured section, must be closed. The branch-pipe $c$ has then to be connected, as shown, to two casings $t\ t^1$ (normally kept closed by the valves $s$, $s^1$), whereupon the valves $s$, $s^1$ of these two casings $t\ t^1$ can be opened, the branch $c$ thus replacing the burst section of the piping $a$.

The arrangement illustrated in Fig. 2 differs from that just described only in as far that casings $t\ t^1$ with valves $s\ s^1$ are dispensed with, the flanged outlets of the connecting-pieces being closed by simple covers. On the piping $a$ bursting, say at $x$, the two valves $r\ r^1$ in advance of the burst section, and the two valves $r^2\ r^3$ beyond it, must be closed. The cover of the connecting-piece $p^1$ which is located in advance of the valve $r^1$, and the cover of the connecting-piece $p^2$ which is located beyond the valve $r^2$, have then to be removed and the ends of the branch-pipe $c$ connected at these parts. It is then only necessary to open the valves $r\ r^3$, the branch-pipe $c$ establishing the continuity of the piping.

Having thus described my invention, what I claim as new and desire to secure by Letters Patent is:—

1. The combination with a pipe, of pairs of connecting pieces inserted at predetermined distances therein with a valve between the members of each pair, a valve for each connecting piece and a branch pipe connectible at its respective ends with the valves for the outer connecting pieces of any two consecutive pairs of connecting pieces, substantially as described.

2. In combination, a continuous pipe, pairs of T-shaped connecting pieces inserted at predetermined distances therein with a valve between the members of each pair, a branch pipe connectible with the connecting pieces of any two pairs, said valves being adapted to close communication with a burst section.

In witness whereof I have hereunto signed my name this 13th day of May 1907, in the presence of two subscribing witnesses.

JOHANN KOENIG.

Witnesses:
EMIL WITZENMANN,
ERNEST ENTENMANN.